(12) United States Patent
Habiba

(10) Patent No.: US 12,019,653 B2
(45) Date of Patent: Jun. 25, 2024

(54) BLOCKCHAIN CLOCK FOR STORING EVENT DATA

(71) Applicant: INTERNATIONAL BUSINESS MACHINES CORPORATION, Armonk, NY (US)

(72) Inventor: Mansura Habiba, Jhonstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 17/643,037

(22) Filed: Dec. 7, 2021

(65) Prior Publication Data
US 2023/0177068 A1    Jun. 8, 2023

(51) Int. Cl.
| | |
|---|---|
| G06F 7/00 | (2006.01) |
| G06F 16/18 | (2019.01) |
| G06F 16/27 | (2019.01) |
| G06N 20/00 | (2019.01) |
| H04L 67/10 | (2022.01) |
| G06F 21/60 | (2013.01) |

(52) U.S. Cl.
CPC .......... *G06F 16/27* (2019.01); *G06F 16/1805* (2019.01); *G06N 20/00* (2019.01); *H04L 67/10* (2013.01); *G06F 21/604* (2013.01)

(58) Field of Classification Search
CPC .. G06F 16/27; G06F 16/1805; G06F 16/2379; G06F 21/604; G06N 20/00; G06N 3/126; G06N 3/048; G06N 3/08; H04L 67/10; G06Q 40/04; G06Q 40/02
See application file for complete search history.

(56) References Cited

U.S. PATENT DOCUMENTS

| | | | |
|---|---|---|---|
| 11,443,307 B2 * | 9/2022 | Sun | G06Q 20/10 |
| 2018/0157700 A1 | 6/2018 | Roberts | |
| 2019/0268277 A1 * | 8/2019 | Asthana | H04L 67/10 |

(Continued)

FOREIGN PATENT DOCUMENTS

| | | |
|---|---|---|
| CN | 110417502 A | 11/2019 |
| CN | 112015705 A | 12/2020 |

(Continued)

OTHER PUBLICATIONS

Ali, et al; "BCALS: Blockchain-Based Secure Log Management System for Cloud Computing", Apr. 2021, 21 Pages. https://www.researchgate.net/publication/350947485_BCALS_Blockchain-based_secure_log_management_system_for_cloud_computing.

(Continued)

*Primary Examiner* — Mohammad A Sana
(74) *Attorney, Agent, or Firm* — Steven M. Bouknight

(57) ABSTRACT

A method generating a blockchain clock to store event data, as well as a method for using the generated blockchain clock are proposed. In particular, as a blockchain clock is utilized for storing event data, the transparency of the stored event data and relationships between event data may be preserved. Moreover, event data is stored on the blockchain clock based on a risk value computed based on the event data. In this way, event data associated with potentially risky events is stored, and thus may be used for reference when deciding whether to execute a potential event. Accordingly, system security may be improved.

15 Claims, 8 Drawing Sheets

(56) References Cited

U.S. PATENT DOCUMENTS

| | | | |
|---|---|---|---|
| 2020/0117730 A1 | 4/2020 | Vaswani | |
| 2020/0294124 A1* | 9/2020 | Jia | H04L 63/14 |
| 2020/0371832 A1 | 11/2020 | Baset | |
| 2021/0042421 A1* | 2/2021 | Li | H04L 9/50 |
| 2022/0067738 A1* | 3/2022 | Fang | G06Q 20/4016 |
| 2022/0166602 A1* | 5/2022 | Wu | H04L 9/50 |
| 2023/0070321 A1 | 1/2023 | Dezhuang | |

FOREIGN PATENT DOCUMENTS

| | | |
|---|---|---|
| CN | 112287336 A | 1/2021 |
| CN | 110490728 B | 3/2021 |
| CN | 112434949 A | 3/2021 |
| CN | 112564985 A | 3/2021 |
| CN | 112751729 A | 5/2021 |
| CN | 113191137 A | 7/2021 |
| TW | 201947446 A | 12/2019 |
| WO | 20230105384 A1 | 6/2023 |

OTHER PUBLICATIONS

Disclosed Anonymously, "Method and System for Automatic Log Discovery, Identification, Collection and Parsing", IPCOM000250171D, ip.com, Jun. 7, 2017, 5 Pages.

Mell et al., "The NIST Definition of Cloud Computing", Recommendations of the National Institute of Standards and Technology, NIST Special Publication 800-145, Sep. 2011, 7 pages.

International Search Report and Written Opinion for Application No. PCT/IB2022/061771, dated Mar. 13, 2023, 8 pgs.

Office Action for counterpart Taiwan Application No. 111132630, filed Aug. 30, 2022, mailed Jun. 29, 2023, 13 pages.

* cited by examiner

BLOCKCHAIN CLOCK FOR STORING EVENT DATA

BACKGROUND

Event logs are generated by nearly every computing device when interacting with a system. Usually, an event log is produced for each event that occurs throughout the use of the system. The recording of event logs allow users, developers and administrators to understand how a system is being utilized, and therefore provides a means of improving system security.

In order to understand event logs, log management provides an approach for dealing with large volumes of generated event logs (usually for the purpose of improving security of the system). Log management comprises two aspects—log monitoring and log analysis. Log monitoring is a process of reviewing collected logs as they are recorded, while log analysis is a process usually performed by skilled persons, often related to troubleshooting issues.

This approach (of reviewing collected logs, followed by manual analysis) often means that real-time, reactive analysis and response is not possible. Indeed, difficulty of analysis is increased by the fact that event logs are often formatted in a variety of ways. Further, event logs are usually stored as isolated entities, without links to other temporally and/or causally related events.

Thus, there are many challenges in producing meaningful results from real-time log management. Accordingly, there exists a need for means that may provide real-time log management to deliver secure systems.

SUMMARY

The present invention seeks to provide a method for generating a blockchain clock to store event data, which may be used by a method for controlling execution of an event associated with a log entry on a computing system. Such methods may be computer-implemented. That is, such methods may be implemented in a computer infrastructure having computer executable code tangibly embodied on a computer readable storage medium having programming instructions configured to perform a proposed method. The present invention further provides a computer program product including computer program code for implementing the proposed method when executed on a processor. The present invention further provides a system for controlling execution of an event associated with a log entry on a computing system.

According to an aspect of the present invention there is provided a method for generating a blockchain clock to store event data, the method comprising: processing a log entry to extract event data; computing a risk value based on the extracted event data; and storing extracted event data on the blockchain clock based on the computed risk value. In this way, a blockchain clock may be provided that records a history of event data. The event data added to the blockchain clock is based on a risk value associated with extracted event data. In this way, only event data that may be associated with a certain risk may be stored on the blockchain clock. Thus, the blockchain clock stores event data associated with an event that has an associated certain level of risk. In other words, embodiments of the invention leverage a blockchain in order to preserve the transparency of events and log the event history, meaning that the relationship between events may be effectively recorded. Accordingly, a blockchain of risky events may be obtained, effectively storing both a history of a plurality of events associated with a high risk and the temporal and/or causal relationship between such events.

In particular, as a blockchain clock is utilized for storing event data, the transparency of the stored event data and relationships between event data may be preserved. Moreover, event data is stored on the blockchain clock based on a risk value computed based on the event data. In this way, event data associated with potentially risky events is stored, and thus may be used for reference when deciding whether to execute a potential event. Accordingly, system security may be improved.

A blockchain clock provides a useful means of storing event data associated with log entry, as connections between previous and future events are preserved. This may prove even more useful when storing event data on the blockchain clock based on a computed risk value. According to some aspects of the present invention, the blockchain clock may only store event data associated with events which are particular risky. In such a case, the blockchain clock provides a means for quickly and accurately assessing whether an event is risky or not. Put another way, by storing a comprehensive history of risky events in the blockchain clock, similar events in the future may be quickly and easily identified as risky. In some embodiments, the log entry may comprise a request for access to a cloud computing system.

It may be advantageous to implement a blockchain clock containing event data associated with events on a cloud computing system. In this way, a blockchain clock having event data of risky events for execution on a cloud computing system may be obtained, which may be used to cross-reference with potential events to be run on the cloud computing system, ultimately improving the security of the cloud computing system.

In some embodiments, the stored extracted event data may include at least one of a proof of risk, a proof of access, and a proof of execution. In this way, event data may be categorized into one or more of the proof of risk, proof of access, and proof of execution categories. This may be implemented by a plurality of sub-blockchains of the blockchain clock, such that all the event data determined as risky is assigned to the proof of risk blockchain. Thus, potential events to be run may be compared to the blockchain clock. By way of example, if there were to exist similar event data in the blockchain clock including a proof of risk, then the potential event may not be executed. Likewise, if there were to exist similar event data in the blockchain clock including a proof of access or execution, then the potential event may be performed. In other words, by including at least one of a proof of risk, a proof of access, and a proof of execution in the stored extracted event data, additional context may be given to the event data. Therefore, a decision regarding whether to execute a potential event may be made more accurately.

In some embodiments, the extracted event data used to compute the risk value may comprise at least one of a timestamp, a data type, a user type, and an operation type. By exploiting at least one of a timestamp, a data type, a user type, and an operation type to compute the risk value, a more accurate risk value may be computed. Therefore, the generated blockchain clock may have more relevant event data, and thus may be more effective for identifying potential events to be executed or rejected, improving system security. In some embodiments, computing the risk value may comprise comparing the extracted event data to a predefined policy.

One exemplary method of calculating the risk value of the event data is to compare the event data to a policy defined by a developer. In other words, the predefined policy may define a robust ruleset by which event data is assessed. Accordingly, a more accurate risk value may be computed. Therefore, the generated blockchain clock may have more relevant event data, and thus may be more effective for identifying potential events to be executed or rejected, improving system security. In some embodiments, the predefined policy may comprise at least one of a firewall policy, a network policy, an application layer policy, an access control policy, and a risk severity policy. There may be a number of different policies for different aspects of the system, such as different programs, or different hardware to be accessed. Thus, by having the predefined policy based around the different policy elements, an increased level of nuance may be embedded in the risk value computation. This may lead to a more robust and accurate blockchain clock, and improved system security.

In some embodiments, computing the risk value may comprise inputting the extracted event data to a risk determination machine learning model for determining a risk value based on the extracted event data. By computing the risk value by a risk determination machine learning model, a more accurate risk value may be obtained. Indeed, in some embodiments of the invention the risk determination machine learning model may be able to identify risk factors that, for example, comparison of event data with a predefined policy cannot. Indeed, both methods may be utilized together and an average calculated in order to obtain an accurate and robust risk value for a variety of unseen event data.

In some embodiments, the risk determination machine learning model may be trained using a training algorithm for receiving an array of training inputs and known outputs, wherein the training inputs comprise training event data and associated known risk values. As a result, an accurate and robust risk determination machine learning model may be trained and obtained.

According to another embodiment of the present invention, there is provided a method for controlling execution of an event associated with a log entry on a computing system, the method comprising: generating a blockchain clock according to an embodiment of the invention; receiving a log entry associated with an event; processing the log entry to extract event data; determining whether to execute the event associated with the log entry based on a comparison between the extracted event data and the generated blockchain clock. It has been realized that, by generating a blockchain clock for storing event data based on a computed risk value, security of a computing system may be improved. This may be achieved by comparing event data associated with an event, with the blockchain clock in order to determine whether to execute the event or not. This may enable real-time decision making as to whether an event is risky or not, and therefore real-time decision making regarding whether to execute an event. Thus, the execution of events that may be harmful or lead to subversion of security of the computing system may be avoided. Besides, there may be no need for the manual intervention of a skilled user to ascertain whether an event is risky or not, enabling real-time event interventions as well as saving time and additional costs.

Furthermore, the use of a blockchain clock enables the preservation of transparency of event data, as well as the relationships temporally and/or causally between previous and future events. This provides greater information regarding whether an event should be executed, enabling more accurate decision making. Ultimately, this may result in a computing system with improved security.

According to yet another embodiment of the present invention, there is provided a method for controlling execution of an event associated with a log entry on a computing system by using a blockchain clock, the blockchain clock stores event data based on a computed risk value associated with the event data, the method comprising: receiving a log entry associated with an event; processing the log entry to extract event data; determining whether to execute the event associated with the log entry based on a comparison between the extracted event data and the blockchain clock.

In some embodiments, the method may further comprise a step of, responsive to determining not to execute the event, storing the event data on the blockchain clock including a proof of risk. Thus, the blockchain clock may continue to be augmented as it is utilized. As the blockchain clock is extended with event data including a proof of risk, events with similar event data may be quickly determined not to be executed. Therefore, speed and efficiency of the method for controlling execution of an event may be improved.

In some embodiments, the method may further comprise a step of, responsive to determining to execute the event, storing the event data on the blockchain clock including a proof of access. Similarly to the above, the blockchain clock may continue to be augmented as it is utilized. As the blockchain clock is extended with event data including a proof of access, events with similar event data may be quickly determined to be executed.

In some embodiments, the method may further comprise a step of, responsive to storing the event data on the blockchain clock including the proof of access, executing the event and storing the event data on the blockchain clock including a proof of execution.

Once the event is executed, such information may also be stored on the blockchain clock as including a proof of execution. Therefore, speed and efficiency of the method for controlling execution of an event may be improved.

According to a further embodiment of the present invention, there is provided a computer program product for controlling execution of an event associated with a log entry on a computing system by using a blockchain clock, the blockchain clock stores event data based on a computed risk value associated with the event data, the computer program product comprising a computer readable storage medium having program instructions embodied therewith, the program instructions executable by a processing unit to cause the processing unit to perform a method comprising: receiving a log entry associated with an event; processing the log entry to extract event data; and determining whether to execute the event associated with the log entry based on a comparison between the extracted event data and the generated blockchain clock.

According to another aspect of the invention, there is provided a system for controlling execution of an event associated with a log entry on a computing system, the system comprising: a blockchain generation component for generating a blockchain clock for storing event data based on a computed risk value associated with the event data; an interface unit for receiving a log entry associated with an event; a data extraction component for processing the log entry to extract event data; and a comparison unit for determining whether to execute the event associated with the log entry based on a comparison between the extracted event data and the blockchain clock.

In some embodiments, the blockchain generation component may further store the event data on the blockchain clock including a proof of risk, responsive to determining not to execute the event.

In some embodiments, the blockchain generation component may further store the event data on the blockchain clock including a proof of access, responsive to determining to execute the event.

In some embodiments, the blockchain generation component may further execute the event and store the event data on the blockchain clock including a proof of execution, responsive to storing the event data on the blockchain clock including the proof of access.

These and other aspects of the invention will be apparent from and elucidated with reference to the embodiment(s) described hereinafter.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
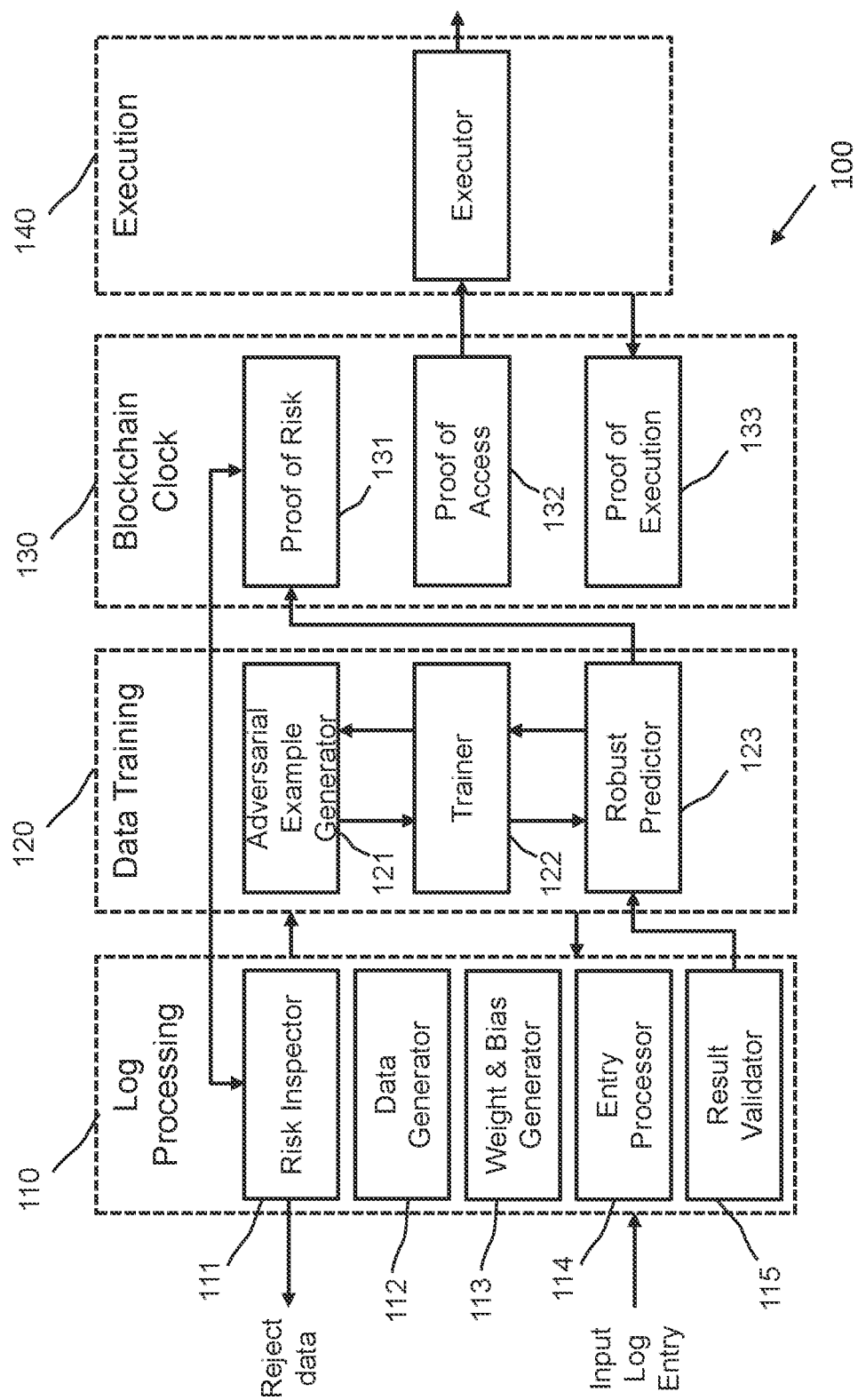
FIG. 1 is a block diagram of an example system for controlling execution of an event associated with a log entry on a computing system according to an embodiment.

The invention will be described with reference to the Figures. It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms. Also, in the context of the present application, a system may be a single device or a collection of distributed devices executing one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Implementations in accordance with the present disclosure relate to various techniques, methods, schemes and/or solutions pertaining to a blockchain clock for storing event data based on a computed risk value associated with the event data. In particular, a log entry associated with an event is processed in order to extract event data. A risk value for the event can then be computed based on the event data, and the event data stored on the blockchain clock based on the risk value. Due to being stored in a blockchain, a history of event data may be obtained that also preserves the temporal and/or causal relationship between such events. Put another way, methods for generating a blockchain clock for storing event data, as well as concepts for using the generated blockchain clock are proposed by embodiments of the present invention. Specifically, as a blockchain clock is utilised for storing event data, the transparency of the stored event data may be preserved, as well as a log entry history. Additionally, event data is stored on the blockchain clock based on a risk value computed based on the event data. Thus, system security may be improved in instances where a determination regarding whether to execute an event is performed. In this instance, the blockchain clock may be consulted to decide whether to grant permission to execute such events. For example, if the blockchain clock contains event data labelled as risky, which is similar to event data of the potential event, then execution of the potential event may be prohibited. Therefore, a blockchain clock provides a useful means of storing event data associated with log entry, as connections between previous and future events may be preserved.

According to some aspects of the present invention, the blockchain clock may store event data associated with events which are risky (events that may jeopardize the security of the system on which they are executed). In such a case, the blockchain clock provides a means for quickly and accurately assessing whether an event is risky or not. Put another way, by storing a comprehensive history of risky events in the blockchain clock, similar events in the future may be quickly and easily identified as risky or not.

Turning to FIG. 1, there is presented a block diagram 100 of an example security system for controlling execution of an event associated with a log entry on a cloud computing system according to an embodiment. The security system comprises a log processing layer 110, a data training layer 120, a blockchain clock layer 130, and an execution layer 140. In an embodiment, the input to the system is a log entry. A valid log entry may include the following information: time of request, accessing user, source application, source network, communication protocol, source IP address, and target micro service or function. The logging in this case is an access request. Typically, application logs are monitored once a translation or access for data is completed. However, embodiments of the invention monitor events in a proactive manner (rather than a post-event operation). Each time an access is requested, or an API is called, a log entry for corresponding access is input to the log processing layer 110. By way of explanation, the entry processor 114 of the log processing layer 110 extracts event data, which may include a timestamp, a data type, a user model and an operation type, from the log entry. The entry processor 114 may then internally compute a risk factor for input log entry based on the extracted event data.

A weight and bias generator 113 of the log processing layer 110 may be provided, which takes the operation type and data type as input in order to generate a weight matrix. The weight matrix may be generated with a ranged random variable based on the operation type and data type. By way of example, if the operation type is a payment and the data type is card, the generated weight matrix may be assigned a higher value in the ranged random variable. This may result in a more controlled weight during training within the data training layer 120. This may be stated by the following equation (I):

$$\text{weight,bias}=\text{parameter generator}(\text{data type,user model,operation type,time}) \quad (I).$$

In this case, the parameter generator is function of time, and generates a random weight and bias for training. The generated weight and bias reflects the data type, user model and operation type. Indeed, this concept is similar to adding noise for an adversarial sample generator.

A data generator 112 of the log processing layer 110 may check the policies defined in a firewall, a network and an application layer to compute the risk factor ($\alpha$) for not following any policy. The data generator 112 may also check an access control level (ACL) in comparison to the user model of the extracted event data to identify the risk factor ($\beta$) for not following the ACL. Further, the data generator 112 may check the risk severity policy for the operation type of the extracted event data to determine a severity factor ($\gamma$). The data generator 112 may perform a function (F), which is a function of time, on the above factors. In some embodiments of the invention, the function may be a SHA-256 hash of concatenated string of different fields, but is not restricted hereto. In this way, each factor may be converted to a function of time. Moreover, as no original extracted data is used for modelling training, the security of the log data may be preserved. In short, this hashing may be stated by the following equation (II):

$$\text{hash}t=F(t,\alpha,\beta,\gamma) \quad (II).$$

Further, a risk inspector 111 is provided that may query the blockchain clock 130 for proof of risk, thus inspecting if the hash (arising from the event data) indicates that an event associated with the event data is risky or not. If the blockchain clock 130 indicates that the event is risky, the risk inspector 111 rejects the corresponding event. Initially the height of blockchain clock 130 (including the proof of risk blockchain clock 131) may be zero, so even a risky event may be passed as trusted event at this stage. Therefore, risk determination machine learning model (trained with risk aware adversarial examples) may be provided by the data training layer 120 to detect a risky event.

Moving onto the data training layer 120, there is provided an adversarial example generator 121. A typical adversarial example generator is not suitable for training the proposed risk determination machine learning model, as the aim for the risk determination machine learning model is to detect risky events in particular. Therefore, an adversarial example generator 121 is required that may generate adversarial examples to train the risk determination machine learning model that take into account event data and risk factors for the event data as a risky event. Accordingly, the trainer module 122 trains the risk determination machine learning model on incoming data and the risk aware adversarial examples, such that it may predict whether events are risky. As described above the input data for the model is function of time t, so the risk determination machine learning model may be based on ordinary differential equation, with events being continuous in time. Each event hash(t+1) has a previous event hash(t). This dependence on a previous event may aid in detecting anomalies and monitor activity in real time. This may be stated by the following equation (III):

$$\text{hash}(t+1)=\text{hash}(t)+f(\text{hash}t,\theta_t) \quad (III)$$

Here, $\theta$ is the weight and bias parameter for the trainer model 121 (as described in relation to the weight & bias generator). The continuity of events may be formalized as an ordinary differential equation as shown by the following equation (IV):

$$d\text{hash}(t)/dt=f(\text{hash}t,t,\theta) \quad (IV)$$

Thus, a typical ordinary differential solver may be used to train the risk determination machine learning. Accordingly, the robust predictor 123 may comprise a risk determination machine learning model (deep learning model) which is robust against adversarial attacks and makes predictions for risky events. It may apply defensive mechanisms against adversarial attacks to the input. The robust predictor 123 may also feed the output back to trainer 122 in order to establish a reinforcement learning for the trainer 122. Further, the risk determination machine learning model of the robust predictor 123 may predict risky events and add a block to the blockchain clock 130 along with a proof of risk when a risky event is predicted. Moreover, if the incoming entry is identified as non-risky event by the risk determination machine learning model of the robust predictor module 123, it may add a block to the blockchain clock 130 along with a proof of access.

Turning briefly back to the log processing layer 110, a result validator 115 may be provided, which performs quality check on the results of the risk determination machine learning model. This may be based on a user input regarding the expectation of the results and accuracy of outputs from the risk determination machine learning model. The result validator 115 may continuously accept the reward as input from a user or generate the reward from any predefined function to evaluate the result of the risk determination machine learning model.

Moving onto the blockchain clock layer 130, there may be provided three different blockchain clocks. These blockchains work as clocks for events with evidence of occurrence of an event. Namely, the blockchain clocks include a proof of risk 131, a proof of access 132, and a proof of execution 133. A core concept for the blockchain clocks is to record the proof of occurrence of risky and successful events from input log entry. By way of example, in response to a user taking a screen-shot of the user's profile page within an authorized web application, the blockchain clock proves that the user has already signed up to the application, and has also signed in to the application. A blockchain clock of the events will assure that the user is trusted and followed previous steps in order to gain permission to access the profile page. Conversely, the absence of signup and sign-in event in the proof of access blockchain can easily identify the user as a malicious user, and so a further event may be prevented.

The proof of risk blockchain 131 may trace the opposite information. Once an event is identified as a risky one (or the proof of access blockchain rejects the transaction as an untrusted transaction), a block may be added to the proof of risk blockchain 131. This block may include several pieces of metadata, such that the blockchain clock 130 preserves the transparency of the event occurrence. Once a trusted event is executed by the executor, a block may be added to the proof of execution blockchain 133. Put simply, the proof of risk blockchain 131 traces risky events, the proof of access blockchain 132 stores trusted events, and the proof of execution blockchain 133 stores executed events.

Finally, once an event is added to the proof of access blockchain 132 (as a trusted event), the executor 140 may establish the communication channel for target function, API or micro-service define by the event, and the corresponding data function is executed.

Furthermore, it is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
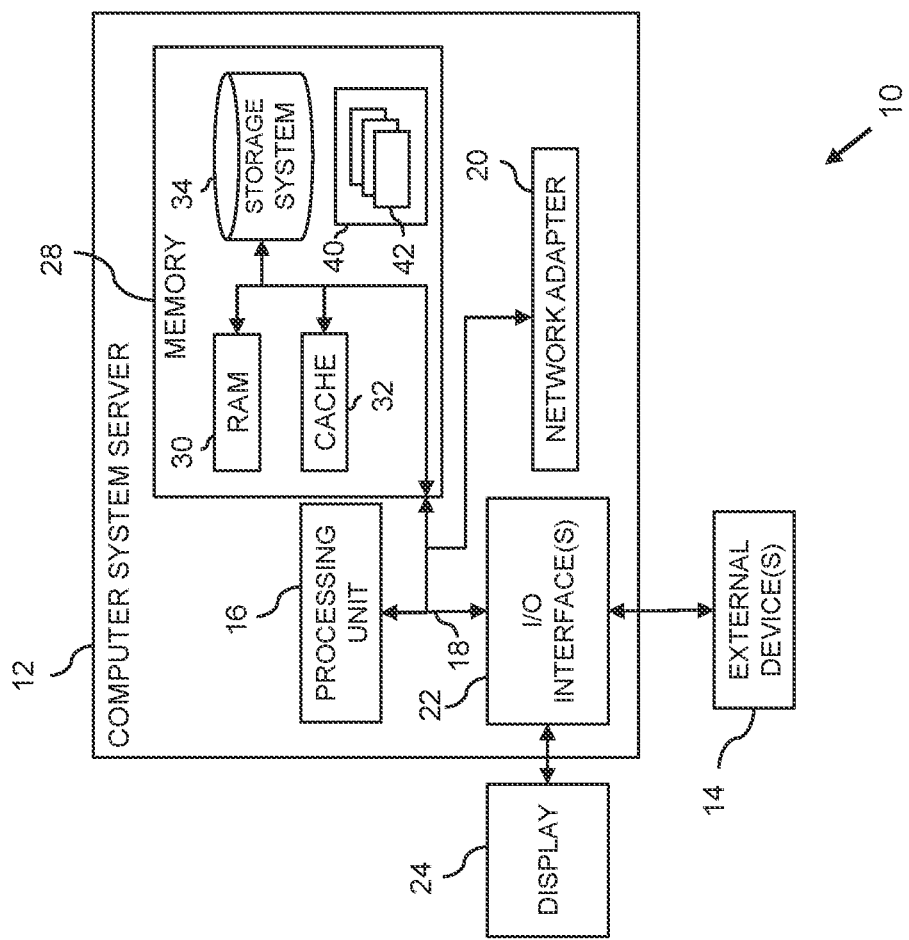
FIG. 2 depicts a cloud computing node according to an embodiment of the present invention.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 3:
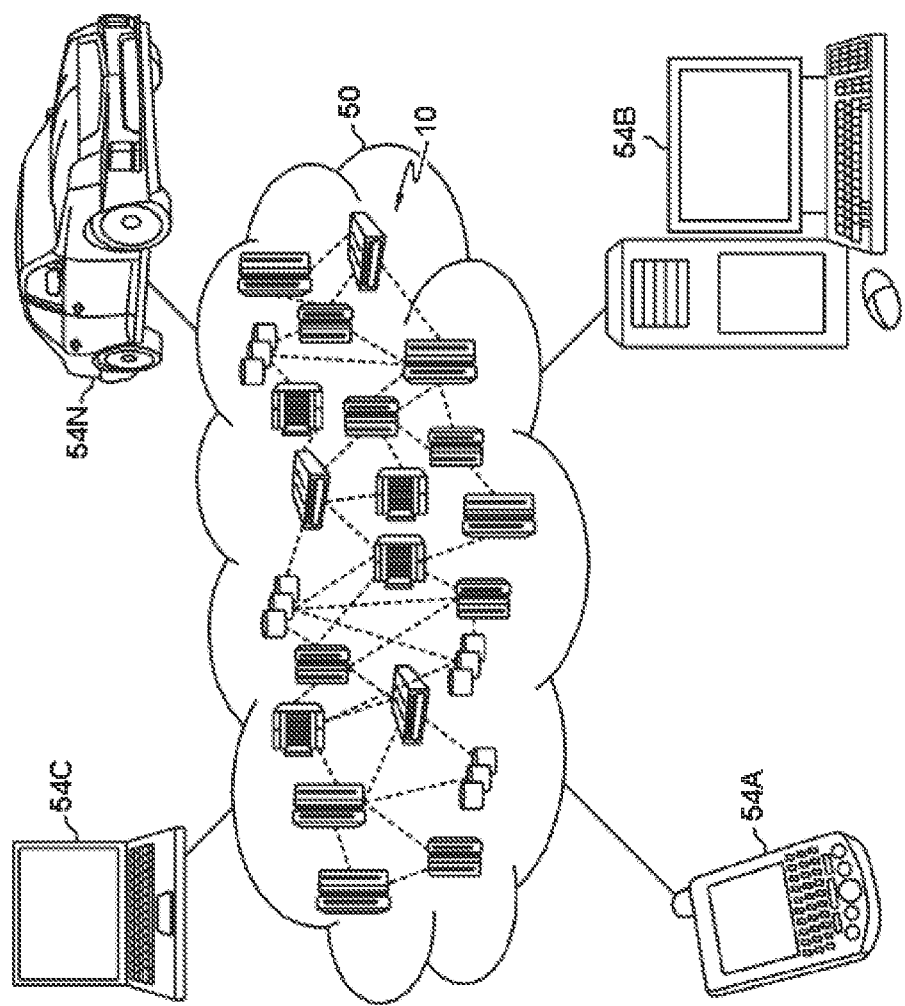
FIG. 3 depicts a cloud computing environment according to embodiments of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
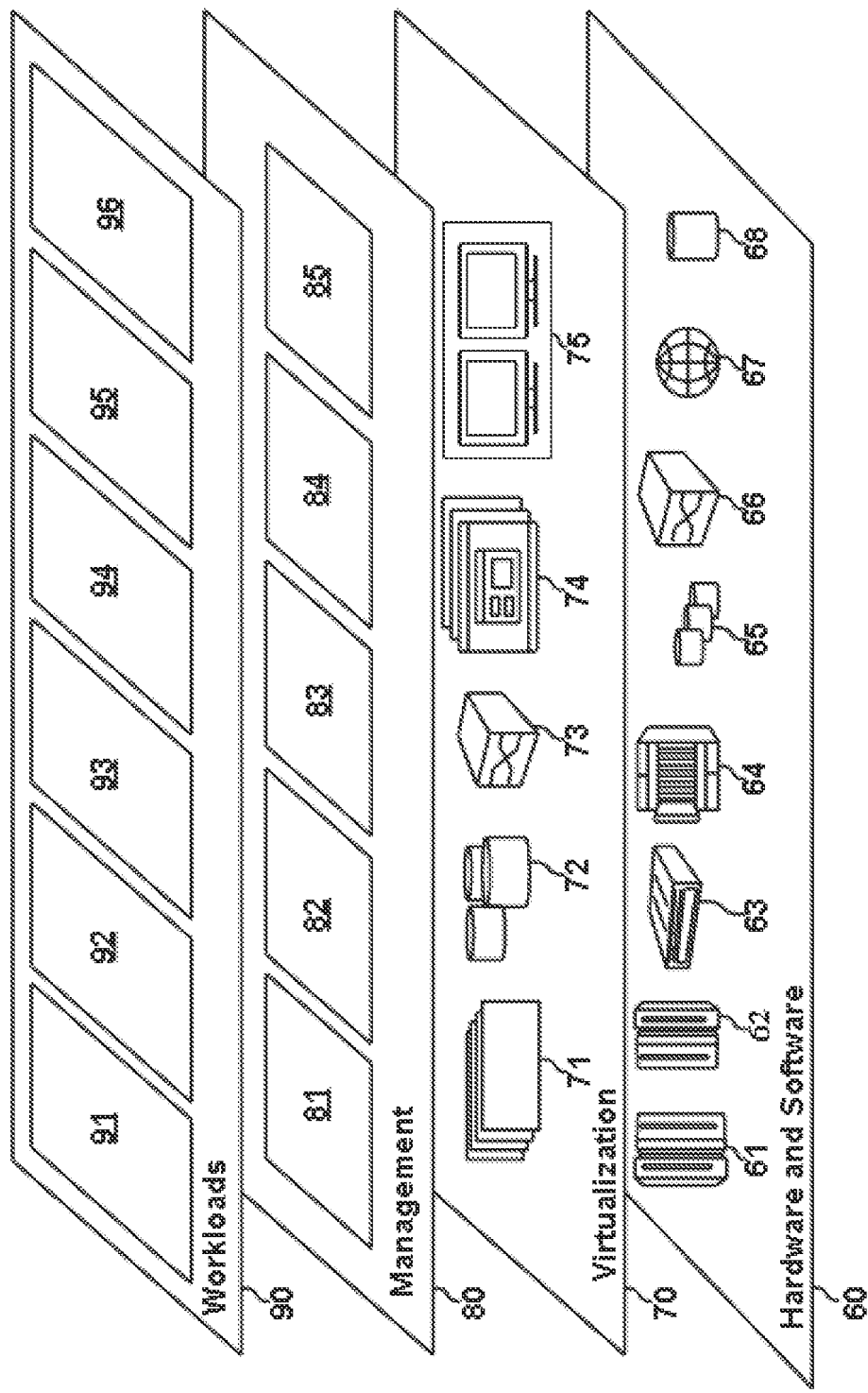
FIG. 4 depicts abstraction model layers according to embodiments of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Real-time security processes 85 provide control over execution of events. In accordance with aspects of the invention, the real-time security processes function is to perform a method for generating a blockchain clock for storing event data, and a method for controlling execution of events associated with log entries on the cloud system.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory management 96.

Figure 5:
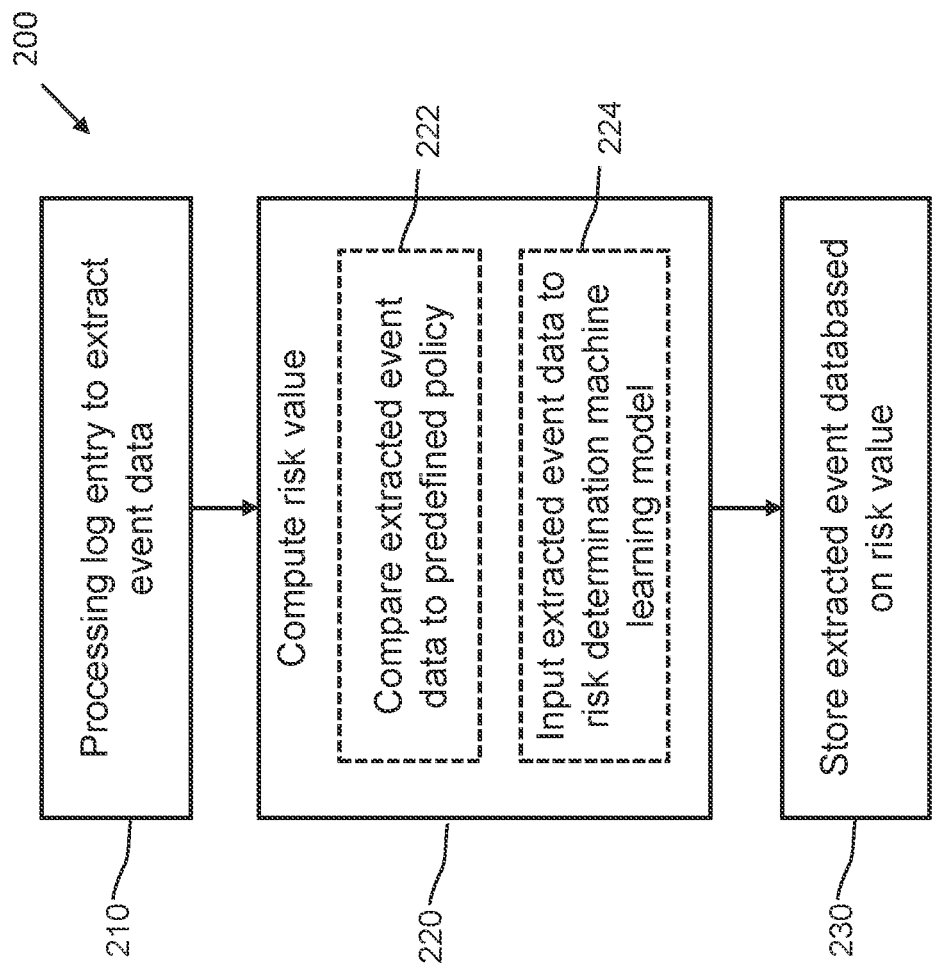
FIG. 5 is a simplified flow diagram of a method for generating a blockchain clock for storing event data according to an exemplary embodiment.

Referring now to FIG. 5 is a simplified flow diagram 200 of a method for generating a blockchain clock for storing event data according to an exemplary embodiment. At step 210, a log entry is processed to extract event data. A log entry is generated for many events when interacting with a computing system. Typically, a log entry enables users to understand how a system is being utilized. A log entry may contain information such as a timestamp, a user ID, a source application ID, a source network communication protocol, a source IP address, and a target service or function. When a system attempts to access a cloud computing system (for example, to access a source or service), a log entry may be generated. The log entry in this case may be a request for access to the cloud computing system. It may prove beneficial to analyze these log entries, as cloud computing systems may be most vulnerable at the point of entry request. In other words, when interacting with a cloud computing system many log entries may be generated. In an embodiment of the invention, these log entries may be processed in order to obtain event data relating to an event corresponding to the log entry. This normalized event data may then be used in subsequent steps. Indeed, in some embodiments, the event data may be hashed and obscured, such that the original data is not be ultimately added to the blockchain clock, improving privacy. Furthermore, it should be noted that event data of the log entry may be extracted by processing the log entry to produce a structured array of event data. Accordingly, further processing of the log entry by the event data may be simplified as the data is normalized.

At step 220, a risk value is computed based on the extracted event data. The extracted event data used to compute the risk value comprises at least one of a timestamp, a data type, a user type, and an operation type. An operation type may be indicative of a risk involved in performing the event associated with the log entry. For example, if the operation type is a re-write operation, this may be considered more risky than a read operation. Moreover, a user type may also be indicative of a risk involved in performing the event associated with the log entry. For example, if the user is a system administrator, the event may be considered less risky than an unverified user.

Step 220 may include sub-step 222. At step 222, the extracted event data is compared to a predefined policy in order to compute the risk value. In some embodiments, the predefined policy comprises at least one of a firewall policy, a network policy, an application layer policy, an access control policy, and a risk severity policy. Indeed, if the extracted event data abides by the predefined policy, then an event may have a relatively low risk value than extracted event data that contravenes he predefined policy.

Step 220 may further include sub-step 224. At step 224, the extracted event data is input to a risk determination machine learning model for determining a risk value based on the extracted event data, in order to compute the risk value. The risk determination machine learning model is trained using a training algorithm that receives an array of training inputs and known outputs, wherein the training inputs comprise training event data and associated known risk values. The risk determination machine learning model may be an artificial neural network (or, simply, a neural network). The structure of an artificial neural network is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output. There are several types of neural network, such as convolutional neural networks (CNNs) and recurrent neural networks (RNNs). Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique. For example, weightings of the mathematical operation of each neuron may be modified until the error converges. Known methods of modifying a neural network include gradient descent, backpropagation algorithms and so on.

Turning back to FIG. 5, in embodiments of the invention both sub-steps 222 and 224 may be provided, or only one of sub-steps 222 and 224, or neither. At step 230, the extracted event data is stored on the blockchain clock based on the computed risk value. For example, only extracted event data having a high risk value may be stored, or extracted event data having a low risk value may be stored. In some embodiments, the stored extracted event data includes at least one of a proof of risk, a proof of access, and a proof of execution. Put another way, the extracted event data may be added to either a proof of risk sub-blockchain of the blockchain clock, or a proof of access sub-blockchain of the blockchain clock depending on the associated risk value. Moreover, if the event is executed on a system, the extracted event data may be added to the proof of execution sub-blockchain of the blockchain clock.

Figure 6:
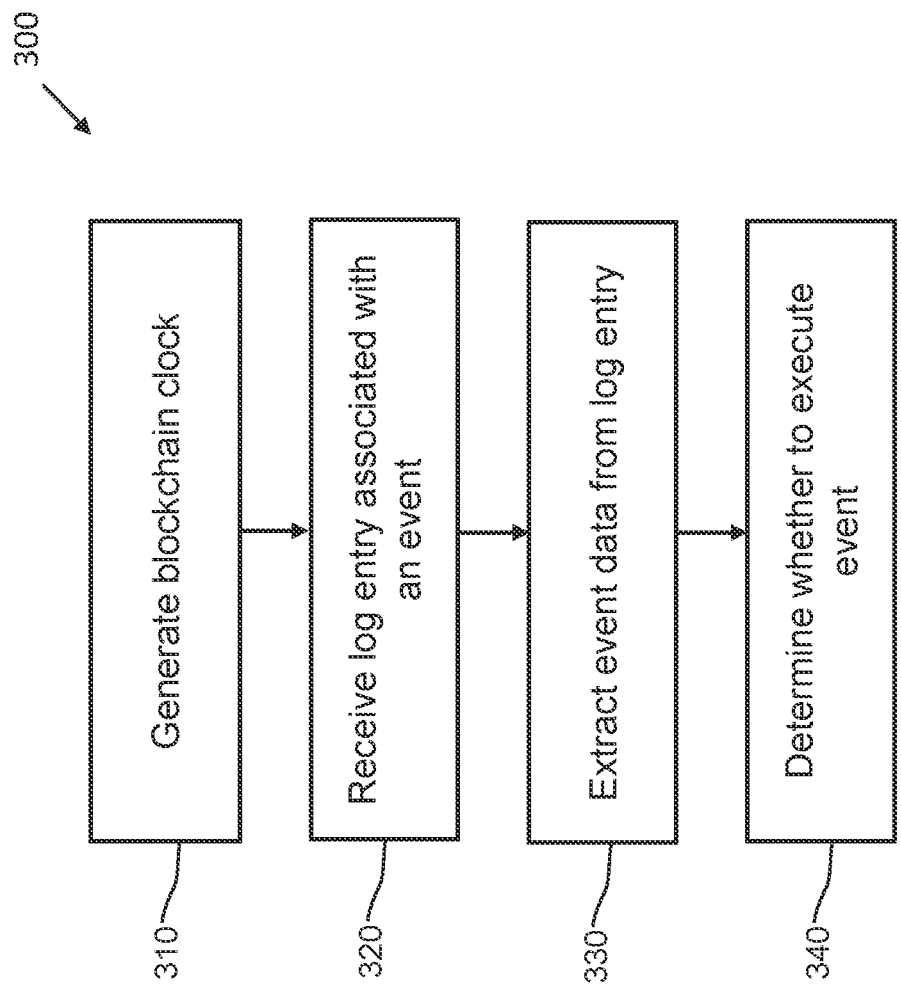
FIG. 6 is a simplified flow diagram of a method for controlling execution of an event associated with a log entry on a computing system according to another exemplary embodiment.

FIG. 6 presents a simplified flow diagram 300 of a method for controlling execution of an event associated with a log entry on a computing system according to another exemplary embodiment. At step 310, a blockchain clock is generated according to an aspect of an embodiment of the invention described in relation to FIG. 5. Accordingly, the blockchain clock may store event data based on a computed risk value associated with the event data. At step 320, a log entry associated with an event is received. The log entry may be actively intercepted as it is logged by the system (cloud computing system), or it may be received by another module. At step 330, the log entry is processed in order to extract event data. This may be performed similarly to the method described in relation to step 210 of FIG. 5. Thus extracted event data may be similarly formatted to the event data extracted to form the blockchain clock. At step 340, it is determined whether to execute the event associated with the log entry. This is based on a comparison between the extracted event data and the generated blockchain clock. By way of example, the blockchain clock may contain event data related to "risky" events (i.e. due to a computed high risk value). As a result, if extracted event data of the event being controlled matches that of risky events with a pre-computed high risk value, the execution of the event may be prohibited.

Figure 7:
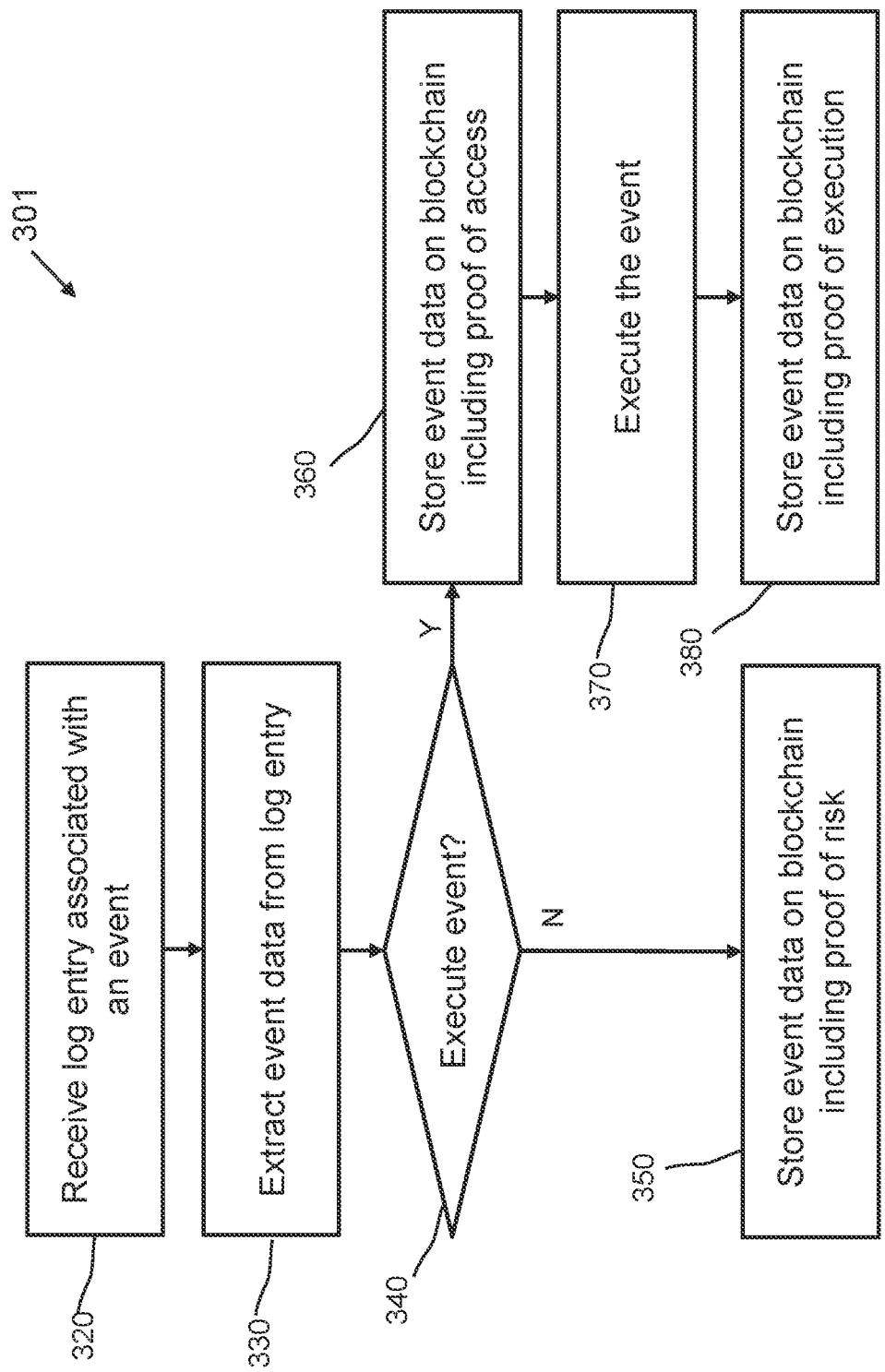
FIG. 7 is a simplified flow diagram of a method for controlling execution of an event associated with a log entry on a computing system by using a blockchain clock, the blockchain clock stores event data based on a computed risk value associated with the event data according to a further exemplary embodiment.

FIG. 7 depicts a simplified flow diagram 301 of a method for controlling execution of an event associated with a log entry on a computing system by using a blockchain clock, the blockchain clock stores event data based on a computed risk value associated with the event data according to a further exemplary embodiment. The blockchain clock may be generated according to an aspect of the invention described in relation to FIG. 5, or may be obtained from memory. Steps 320, 330 and 340 may be equivalent to the steps 320, 330 and 340 described in relation to FIG. 6. Thus, for the sake of conciseness further explanation is omitted. Responsive to determining to not execute the event associated with the log entry at step 340, the method moves on to step 350. At step 350, the event data is stored on the blockchain clock including a proof of risk. Responsive to determining to execute the event associated with the log entry at step 340, the method moves on to step 360. At step 360, the event data is stored on the blockchain clock including a proof of access. At step 370, the event is executed. At step 380, the event data is stored on the blockchain clock including a proof of execution.

Figure 8:
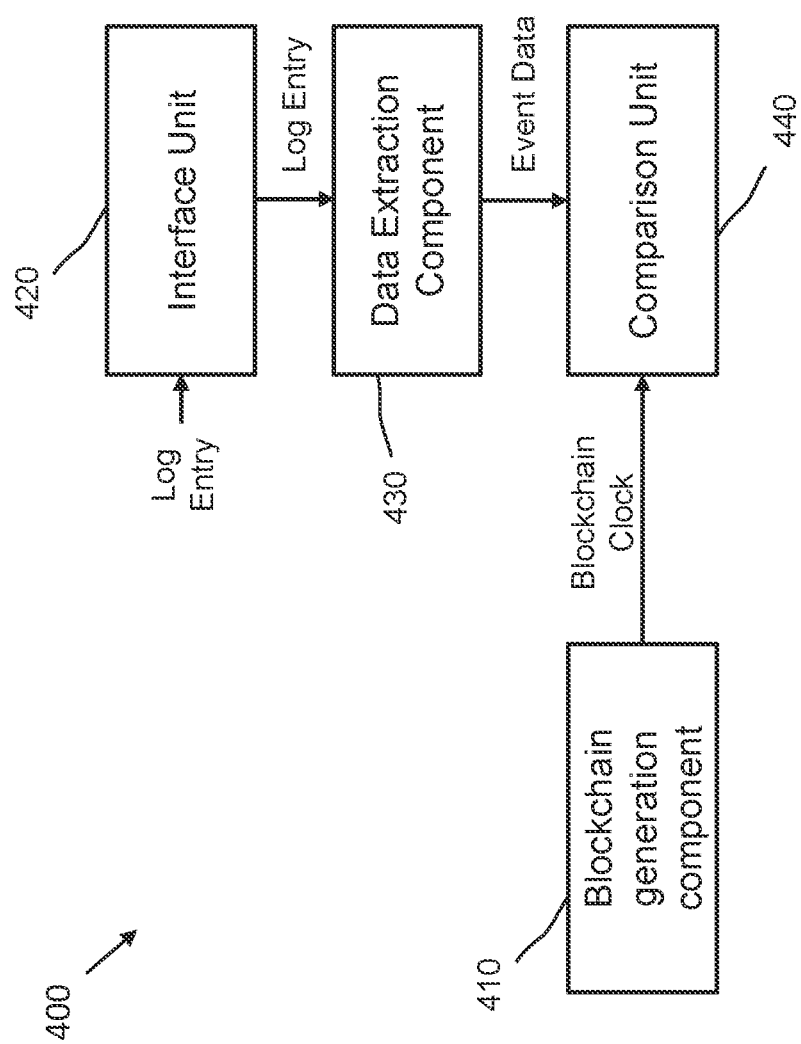
FIG. 8 is a simplified block diagram of a system for controlling execution of an event associated with a log entry on a computing system according to another exemplary embodiment.

FIG. 8 is a simplified block diagram 400 of a system for controlling execution of an event associated with a log entry on a computing system according to another exemplary embodiment. The system comprises a blockchain generation component 410, an interface unit 420, a data extraction component 430, and a comparison unit 440. The blockchain generation component 410 generates a blockchain clock for storing event data based on a computed risk value associated with the event data. The interface unit 420 receives a log entry associated with an event. The data extraction component 430 is processes the log entry to extract event data. The comparison unit 440 is determines whether to execute the event associated with the log entry based on a comparison between the extracted event data and the blockchain clock. In some embodiments of the invention, the blockchain generation component 410 further stores the event data on the blockchain clock including a proof of risk, responsive to determining not to execute the event. In addition, the blockchain generation component 410 may also store the event data on the blockchain clock including a proof of access, responsive to determining to execute the event. Further, the blockchain generation component 410 may execute the event and store the event data on the blockchain clock including a proof of execution, responsive to storing the event data on the blockchain clock including the proof of access.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a blockchain clock for storing event data, the method comprising:
   processing, by a computer security system, a log entry associated with a computer event to extract the event data;
   determining, by a risk determination machine learning model associated with the computer security system, whether the computer event comprises a risky event based on the extracted event data, wherein the determination further comprises,
   computing, based on the extracted event data, a risk value for the computer event, wherein computing the risk value further comprises computing, concurrently as a function of time, a first risk factor for not following one or more predefined policies based on the computer event, a second risk factor for not following an access control level based on the computer event, and a severity factor including a risk of severity based on an operation type of the computer event;
   storing, by the computer security system, the extracted event data on the blockchain clock based on the computed risk value.

2. The method of claim 1, wherein the log entry is a request for access to a cloud computing system.

3. The method of claim 1, wherein the stored extracted event data includes at least one of a proof of risk, a proof of access, and a proof of execution.

4. The method of claim 1, wherein the extracted event data used to compute the risk value comprises at least one of a timestamp, a data type, a user type, and the operation type.

5. The method of claim 1, wherein computing the risk value comprises comparing the extracted event data to a predefined policy.

6. The method of claim 5, wherein the predefined policy comprises at least one of a firewall policy, a network policy, an application layer policy, an access control policy, and a risk severity policy.

7. The method of claim 1, wherein the risk determination machine learning model is trained using a training algorithm, wherein the training algorithm receives an array of training inputs and known outputs, and wherein the training inputs comprise training event data and associated known risk values.

8. A method for controlling execution of an event associated with a log entry on a computing system by using a blockchain clock, the method comprising:
receiving a log entry associated with the event;
processing the log entry to extract event data; and
determining whether to execute the event associated with the log entry based on a comparison between the extracted event data and stored event data on the blockchain clock, wherein the determining whether to execute the event further comprises determining whether the extracted event data matches the stored event data having a computed risk value indicative of a risky event, wherein the computed risk value for the stored event data is determined by computing, using a function of time algorithm, a first risk factor for not following one or more predefined policies based on the stored event data, a second risk factor for not following an access control level based on the stored event data, and a severity factor including a risk of severity based on an operation type of the stored event data.

9. The method of claim 8, further comprising:
responsive to determining not to execute the event, storing the extracted event data on the blockchain clock including a proof of risk.

10. The method of claim 8, further comprising:
responsive to determining to execute the event, storing the extracted event data on the blockchain clock including a proof of access.

11. The method of claim 10, further comprising,
responsive to storing the extracted event data on the blockchain clock including the proof of access, executing the event and storing the extracted event data on the blockchain clock including a proof of execution.

12. A computer program product for controlling execution of an event associated with a log entry on a computing system by using a blockchain clock, the computer program product comprising a computer readable storage medium having program instructions embodied therewith, the program instructions executable by a processing unit to cause the processing unit to perform a method comprising:
generating the blockchain clock and storing event data on the blockchain clock based on a computed risk value associated with the event data, wherein the computed risk value for the event data is determined by computing, using a function of time algorithm, a first risk factor for not following one or more predefined policies based on the event data, a second risk factor for not following an access control level based on the event data, and a severity factor including a risk of severity based on an operation type of the event data;
receiving the log entry associated with the event;
processing the log entry to extract the event data; and
determining whether to execute the event associated with the log entry based on a comparison between the extracted event data and the stored event data on the generated blockchain clock.

13. The computer program product of claim 12, further comprising:
in response to determining not to execute the event, storing the extracted event data on the blockchain clock including a proof of risk.

14. The computer program product of claim 12, further comprising:
in response to determining to execute the extracted event, storing the event data on the blockchain clock including a proof of access.

15. The computer program product of claim 14, further comprising:
in response to storing the extracted event data on the blockchain clock including the proof of access, executing the event and storing the extracted event data on the blockchain clock including a proof of execution.

* * * * *